Jan. 24, 1956 G. PRÖPSTL 2,732,287

METHOD OF MAKING COPIES AND REPRODUCTIONS

Filed Sept. 30, 1953

INVENTOR
GEORG PRÖPSTL
BY
ATTORNEY

United States Patent Office 2,732,287

Patented Jan. 24, 1956

2,732,287

METHOD OF MAKING COPIES AND REPRODUCTIONS

Georg Pröpstl, Wurttemberg, Germany, assignor to Robert Bosch G. m. b. H., Stuttgart, Germany Application September 30, 1953, Serial No. 383,235

9 Claims. (Cl. 41—41)

Figure 1:
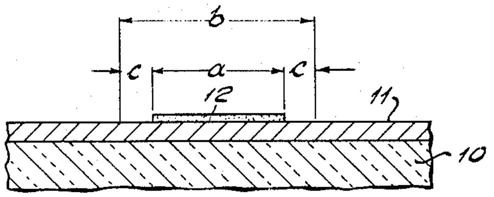

This application is a continuation-in-part of application Serial No. 302,247, filed August 1, 1952, now abandoned.

The present invention relates to a novel method of producing copies or reproductions of pictures, drawings, graphical representations, printed and other subject matter, etc., more particularly to a method comprising the production of a latent or invisible image upon a copy sheet or base and subsequent development of the latent image into the visible image or copy.

Among the objects of the invention is the provision of a method of this type which is both simple and easy to use; which will enable a latent image to be produced simply by contact with an object or original to be reproduced; which can be adapted for either direct reproduction of an original or for use as a master to produce additional copies by means of known reproduction processes; and which will enable a relatively simple development of the invisible or latent image into the visible image or copy.

With the foregoing and further objects in view, as will become more apparent hereafter, the invention is based essentially on the development by disintegration of an extremely thin metallic layer deposited upon a suitable base, such as a light pervious base or copy sheet, said layer having impressed thereon a latent image by a suitable activating substance to result in a selective disintegration of the activated and non-activated elemental image area, respectively, during development.

For practical purposes, it has been found that metallized layers having a thickness of 0.005 to 2$\mu$ (1$\mu$=1/1000 of a millimeter) deposited in finely-divided or highly dispersed condition, such as by a cathode disintegration or evaporation process in a vacuum, provide consistent and satisfactory results. Layers of such minute thickness can be affected or preconditioned by a foreign substance or activator applied thereto with or without a certain pressure, in such a manner as to accelerate or decelerate the rate of disintegration upon subsequently subjecting the layers to a suitable disintegrating or developing agent. as a result of this selective disintegration determined by the activator, the latent image formed thereby can be developed by a proper control of the disintegration or developing time, to produce a visible image of the original subject matter represented by the activated elemental areas of the metallized layer.

As an example, according to a most simple realization of the invention, contact of the metallized layer with the page of a book or other printed matter, under adequate pressure, has been found to be sufficient to transfer infinitesimal amounts of ink or pigment from the print onto the metallized layer, to produce a latent image by varying the rate of reaction of a suitable disintegrating agent with the activated and non-activated areas, respectively, during a subsequent disintegration or development process, such as by subjecting the metallized layer to an atmosphere of bromine or ammonia vapors.

The fact that such an infinitesimal or superficial effect upon the metallized layer is sufficient to affect the rate of reaction of the disintegrating agent to afford the production of copies or images of adequate contrast and resolution, is due basically to the minute thickness, as mentioned, as well as to the structure of a metallized layer. More particularly, with metal layers of this type and thickness deposited in highly dispersed or finely-divided condition of the metal, such as by a cathode disintegration or evaporation process in a vacuum, the behavior of the entire layer or metal body is dependent to a predominating degree upon the surface condition of the layer, substantially more so than in the case of a compact metal body or layer. Moreover, pure geometric reasons play an important part in the formation of a well-defined latent image according to the invention, as will become more apparent from the following.

The development or disintegration, in particular in the case of a chemical developer, constitutes a gradually progressing process, starting at an initial point or development center. For the purpose of this discussion it may be reasonably assumed that the reaction, once started at the surface, progresses with approximately equal speed both tangentially along as well as transversely to the metallized layer. If the reaction is interrupted at the instant of reaching the opposite or inner side of the layer, it is evident that in this case the developed image differs from the effective latent image merely by an amount equal to or of the order of the thickness of the metallized layer. From this it follows further that the developed image equals the original or latent image to an increasing degree the smaller the thickness of the metal layer. For this reason, layers having a thickness below about 2$\mu$ not only afford the production of a latent image in a most simple manner by the application thereto of a suitable activating substance, but result in a developed image, upon disintegration of the non-activated portions of the layer, having a high degree of contrast and definition.

The invention will be better understood from the following detailed description taken in reference to the accompanying drawing, forming part of this specification and wherein:

Fig. 1 shows, on a greatly enlarged scale, a portion of a metallized reproduction sheet having applied thereto an elemental latent image by an activator in accordance with the invention; while Figs. 2 to 5 illustrate various developed images of the latent image of Fig. 1 obtainable with different activators and developing agents.

Referring more particularly to Fig. 1, the numeral 10 represents a base or recording sheet consisting, for instance, of paper, polystyrene or any other suitable material and having applied thereto a coherent layer 11 of finely-divided metallic particles, such as of zinc, cadmium, aluminum, etc., or a suitable mixture of metals, said layer being preferably deposited by a disintegration or evaporation process in a vacuum. The numeral 12 represents a thin layer of a suitable activator applied to the layer 11 and representing an elemental picture area of the invisible or latent image to be developed into a visible image. Referring to the above example, the latent image may be simply produced by slightly pressing the layer 11 against a printed sheet, such as the page of a book, drawing, etc., whereby to cause an infinitesimal amount of the printing ink or pigment to be transferred and to superficially adhere to or partially penetrate the surface of the metal layer 11. By then subjecting the sheet to a suitable developer or disintegrating agent for the metal, such as an ammonia or bromine vapor, the disintegration will be accelerated or decelerated, as the case may be, at the activated or image area 12, in such a manner as to result in an image of the original subject matter, provided a proper timing or interruption of the development at the instant when the reaction has progressed from the upper to the lower surface of the layer. Such a developed image is shown for instance by Fig. 2.

In the specific example of a printed page and use of bromine or ammonia as a developer, the effect of the printing ink activation is to slow down or decelerate the disintegration at the activated areas, such an activation being more properly termed a negative activation or passivation, as compared with a positive activation resulting in an accelerated reaction or disintegration of the metal layer at the activated areas during development.

Figure 2:
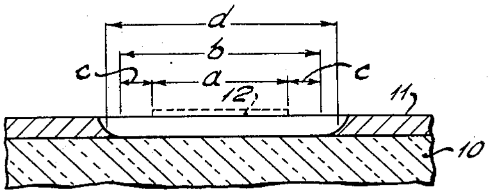
Figure 3:
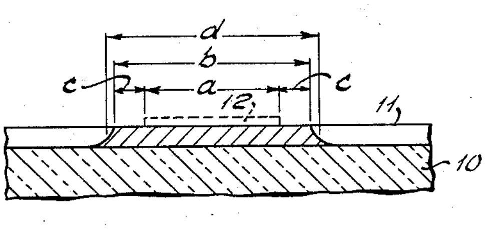
Figure 4:
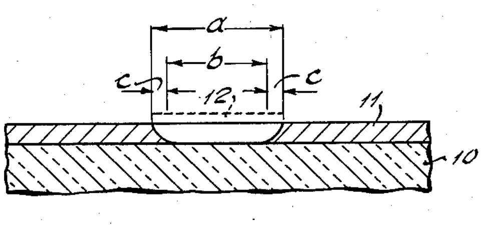
Figure 5:
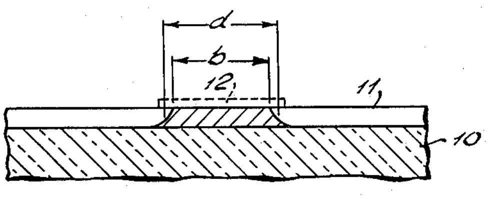

In practice, the area *b* of the effective latent image may differ somewhat from the area of the actual latent image, corresponding to the object or original to be reproduced, by an amount *c* representing an initial active zone or area and being either positive, as in Figs. 2 and 3, or negative, as in Figs. 4 and 5, the former acting to increase and the latter acting to decrease the effective latent image *b* compared with the actual latent image *a*.

The initial reactive zone may be due to interaction between the activator and metal at the boundary of the latent image areas, thus creating additional positive or negative activated areas *c*. Furthermore, since the developer action increases or decreases gradually at the transition from the activated and non-activated areas for reasons of continuity, this results in a further slight difference between the effective latent image *b* and the developed image *d*, respectively.

In the drawing, the initial active zone *c* has been shown exaggerated for the purpose of better illustration. Both the foregoing effects or differences between the latent and developed images are greatly minimized or rendered negligible for practical purposes by the reduction of the thickness of the layer 11 to values coming within the range or below the limit given hereinabove.

Figs. 2 and 3 show the developed image of Fig. 1, assuming activation or passivation, respectively, of the layer 11 by the latent image 12 and a positive initial active zone *c*, while Figs. 4 and 5 illustrate the developed image for both activation and passivation, respectively, and assuming a negative initial active zone *c* at the start of the development.

The activating particles applied to or slightly penetrating the metallized surface layer 11 may affect the development or disintegration of the layer either directly or indirectly by changes effected by the particles at the start or during the development.

Although the actual effects and phenomena taking place during the development of the latent image as a result of the presence of the activating substance forming the latent image are not yet fully understood, the following effects or combinations thereof have been found to afford a fairly reasonable explanation of the physical and chemical phenomena taking place during the formation and development of the latent image.

(*a*) The presence of the activator results in a change of the adsorption between the metal and the developing agent. This different adsorption during the initial phase of the reaction results in a different reaction velocity or attack of the developer upon the activated and non-activated areas, respectively;

(*b*) The activating particles act as development centers or nuclei causing a local accumulation of reacting atoms or groups and resulting in an increased reaction velocity;

(*c*) The activating particles act as a catalyst promoting or accelerating the reaction or development;

(*d*) The activating particles act as inhibitors slowing up or decelerating the action or development;

(*e*) Electric contact potential between the activating and metal particles exert an accelerating or decelerating effect upon the developing action;

(*f*) The activating particles combine with the metal particles to form new products reducing or accelerating the reaction or development.

The minimum developable amount of activating substance has been found in most cases to be less than about 20 micrograms.

In certain cases, the amount of the activator was found to be of importance and critical, if optimum results are desired. This has been evidenced by the fact that varying amounts of activating substance applied to the same metal layer may act as either an activator or passivator respectively. Since metals and their reaction products exhibit substantial differences in optical reflection or absorption, sufficiently contrasty images can be reproduced by the method according to the invention by means of metal layers of minute thickness within and below the range mentioned.

The resolution of the developed image is further determined by the crystal or grain size of the metal particles in addition to the thickness of the layer. However, the condition of the base material may also play an important part. For normal reproduction or microscopic pictures, ordinary or lacquered paper has been found to insure satisfactory results, while for microscopic registration, a highly smooth base is required, such as a plate of glass or a synthetic material.

A large number of activating substances have been investigated by applicant in an effort to determine their usefulness for the purpose of the invention. As a result of these investigations, it has been established that practically every substance if applied in a suitable condition and quantity is able to produce an observable effect, although largely varying in degree and quality of the image obtained. In all cases, however, the minute thickness of the metal layer was found to be a prime prerequisite for producing a developable latent image having an adequate contrast and resolution.

Among the numerous substances tested, the following have been found to give satisfactory results, using either bromine or ammonia vapor as a developer and a metallized zinc layer applied to lacquered paper, polystyrene or equivalent material as a base. The activating substances may be applied to the metal layer in the form of a thin layer of powder of small thickness or in the form of a dispersion in a suitable solvent and subsequent evaporation.

Using bromine fumes as a developer the following preferred activating substances have been found to ensure satisfactory results for reproducing images in accordance with the invention:

Hydrochloric acid 42% ($HCl$); ammonium acetate ($(NH_4)C_2H_3O_2$); ammonium chloride ($NH_4Cl$); hydrogen peroxide 30% ($H_2O_2$); chloride gas ($Cl_2$); bromide gas ($Br_2$); amyl alcohol ($CH_3(CH_2)_3CH_2OH$); glacial acetic acid ($CH_3CO_2H$);

glycerin ($HO.CH_2.CHOH.CH_2OH$);

oxalic acid ($HO_3C.CO_2H$); glycol ($HO.CH_2.CH_2.OH$); and formalin ($HC.HO+H_2O$).

For ammonia as a developer, the following activators have been found to give satisfactory results: Oxalic acid ($HO_3.C.CO_2H$) hydrochloric acid 20% ($HCl$); chloride ($Cl_2$); sulfur dioxide ($SO_2$); ammonium chloride ($NH_4.Cl$); and ammonium acetate ($(NH_4).C_2H_3O_2$).

A variety of gaseous or liquid substances or compounds have been found suitable as disintegrating or developing agents for use in connection with the present invention, a few preferred examples being described in the following. Good results have been obtained with bromine fumes having admixed thereto a suitable ballast gas, such as air, or vapors of the solvents or bromine. This developer is especially useful in connection with metallized layers of zinc. Other halogen vapors have been found to have similar results. Other satisfactory gaseous developers are ammonia-air mixtures containing a suitable amount of moisture and glacial acetic acid vapor including air and moisture.

Suitable liquid developers have been found in the form of concentrated sulphuric acid and bromine or other halogens dissolved in suitable organic solvents, the following being a few preferred examples of zinc layers: chloroform, carbon tetracholoride, various ethers, alcohols, benzol and acetone.

In the following there is described a simplified method of producing copies or reproductions of printed matter, drawings, designs, etc. by use of the method according to the invention.

A sheet or lacquer coated paper, polystyrene or equivalent light pervious material is coated with a thin layer of highly dispersed coherent metal particles, such as a layer of zinc, having a thickness of the order mentioned, said layer being preferably produced by a cathode disintegration or evaporation process in a vacuum, to obtain a metal structure in finely-divided or highly dispersed condition. As an example, the layer may have a thickness of $0.1\mu$ and may be superficially oxidized without materially affecting the final results obtained. The metallized sheet is then pressed with a light and even pressure against the surface of a book page to be reproduced or any other object having applied thereto any printed matter, drawing, designs, etc., the metallized coating being in contact with the printed characters or designs. In case of reproducing a printed page, the metallized sheet may be simply inserted in a book and the latter closed. In many cases the weight of the book will be sufficient to exert pressure upon the copying sheet, but if desirable a slight outside pressure may be applied during a certain time period. In most cases a developable latent image can be produced in this manner within a few minutes sufficient to transfer an infinitesimal amount of printing ink or pigment from the subject matter to be copied to the metallized surface, the transferred material constituting a latent image capable of changing into a visible image upon development with a suitable disintegrating agent, such as a bromine or ammonia atmosphere. The optimum developing time depends both on the type of the activating substance or pigment, as well as upon the nature of developer or disintegrating agent, and can be easily determined by experiment.

Maximum sharpness and definition is obtained by interrupting the development at the instant when the reaction has traversed or progressed to the inner side of the layer, before materially affecting the activated portions or areas constituting the latent image. The development may be interrupted by subjecting the sheet to a suitable neutralizing or stop bath and the remaining metallized areas forming the developed image may be protected against further disintegration, such as by the surrounding atmosphere, by the application of a chemically neutral coating, such as a coating of polystyrene lacquer or an equivalent material. The copy of reproduction obtained in this manner may in turn serve as a means for making further contact prints or enlargements by the aid of any of the known photographic, blueprint, diazo or other reproduction processes.

As will be understood, the invention is not limited to the production of photographic copies using a metallized layer applied to a light pervious base with the metal particles forming a relatively opaque layer upon said base. Thus, an image may be produced upon a printing plate of suitable material and coated with a metallized layer in substantially the same manner as described. Such a plate may serve as a matrix for printing any number of copies by the use of a suitable die or pigment selectively adhering to either the metallized layers or to the base material of the developed image.

Alternatively, use of a suitable base material makes it possible to selectively etch away the non-metallic or disintegrated areas or portions, in an effort to produce a normal printing plate having raised metallized portions, which may in turn be demetallized by subjection to a disintegrating agent to obtain an ordinary printing plate for use in connection with standard printing operations.

Such a printing plate produced either according to the invention or otherwise, may also serve as a means for applying an activator to a metallized copying sheet, if a larger number of metallized prints or copies is desired. For this purpose the printing plate or matrix is first coated with a thin even layer of activating substance in finely-divided or powdered form and then pressed against the metallized coating of the copying sheet to produce a latent image by transfer of the activator to the metallized surface, in a manner readily understood.

In the foregoing the invention has been described with reference to a few illustrative methods and processes. It will be evident, however, that modifications and variations, as well as the substitution of equivalent steps and processes for those described herein for illustration may be made without departing from the broader scope and spirit of the invention as set forth in the appended claims. The specification and drawing are, accordingly, to be regarded in an illustrative rather than in a limited sense.

What is claimed is:

1. A recording method comprising the steps of providing a base member having deposited thereon a coherent layer consisting of highly dispered metallic particles and having a thickness of from 0.005 to $2\mu$, applying to selected areas of said layer conforming to the outline of a record to be produced an activating substance suitable to affect the rate of reaction of the layer metal with a disintegrating agent, to thereby form a latent image of said record, and subjecting said layer to a disintegrating agent during a predetermined time period, to cause a differential disintegration at the activated and non-activated areas, respectively, of the layer metal, whereby to convert said latent image into a visible image upon said member.

2. A recording method comprising the steps of providing a base member having deposited thereon a coherent layer consisting of highly-dispersed metallic particles of the group consisting of zinc, cadmium and aluminum and having a thickness of from 0.005 to $2\mu$, applying to selected areas of said layer conforming to the outline of a record to be produced an activating substance suitable to affect the rate of reaction of the layer metal with a disintegrating agent, to thereby form a latent image of said record, and subjecting said layer to a disintegrating agent during a predetermined time period, to cause a differential disintegration at the activated and non-activated areas, respectively, of the layer metal, whereby to convert said latent image into a visible image upon said member.

3. A recording method comprising the steps of providing a base member having deposited thereon a coherent layer consisting of highly-dispersed zinc particles and having a thickness of from 0.005 to $2\mu$, applying to selected areas of said layer conforming to the outline of a record to be produced an activating substance suitable to affect the rate of reaction of the layer metal with a disintegrating agent, to thereby form a latent image of said record, and subjecting said layer to a disintegrating agent of the group consisting of halogen, ammonia and acetic acid vapors during a predetermined time period, to cause a differential disintegration at the activated and non-activated areas, respectively, of the layer metal, whereby to convert said latent image into a visible image upon said member.

4. A recording method comprising the steps of providing a base member having deposited thereon a coherent layer consisting of highly-dispersed aluminum particles and having a thickness of from 0.005 to $2\mu$, applying to selected areas of said layer conforming to the outline of a record to be produced an activating substance suitable to affect the rate of reaction of the layer metal with a disintegrating agent, to thereby form a latent image of said record, and subjecting said layer to sulphuric acid during a predetermined time period, to cause a differential disintegration at the activated and non-activated areas, respectively, of the layer metal, whereby to convert said latent image into a visible image upon said member.

5. A recording method comprising the steps of providing a base member having deposited thereon a coherent layer consisting of highly-dispersed zinc particles and having a thickness of from 0.005 to 2μ, applying to selected areas of said layer conforming to the outline of a record to be produced an activating substance suitable to affect the rate of reaction of the layer metal with a disintegrating agent, to thereby form a latent image of said record, and subjecting said layer to a disintegrating agent comprising a halogen dissolved in an organic solvent during a predetermined time period, to cause a differential disintegration at the activated and non-activated areas, respectively, of the layer metal, whereby to convert said latent image into a visible image upon said member.

6. A recording method comprising providing a base member having deposited thereon a coherent layer of highly-dispersed zinc particles having a thickness of from 0.005 to 2μ, applying to selected areas of said layer conforming to the outline of the record to be produced an activating substance suitable to affect the rate of reaction of the layer metal with a disintegrating agent, to thereby form a latent image of said record, and subjecting said layer to an atmosphere containing bromine during a predetermined time period, to cause a differential disintegration at the activated and non-activated areas, respectively, of the layer metal, whereby to convert said latent image into a visible image upon said member.

7. A recording method comprising the steps of providing a base member having deposited thereon a coherent layer of highly-dispersed zinc particles having a thickness of about 0.005 to 2μ, applying to selected areas of said layer conforming to the outline of the record to be produced an activating substance suitable to affect the rate of reaction of the layer metal with a disintegrating agent, to thereby form a latent image of said record, and subjecting said layer to an atmosphere containing ammonia during a predetermined time period, to cause a differential disintegration at the activated and non-activated areas, respectively, of the layer metal, whereby to convert said latent image into a visible image upon said member.

8. A recording method comprising the steps of providing a light-pervious base member having deposited thereon a coherent layer consisting of highly-dispersed metallic particles and having a thickness of from 0.005 to 2μ, applying to selected areas of said layer conforming to the outline of the record to be produced an activating substance suitable to affect the rate of reaction of the layer metal with a disintegrating agent, to thereby form a latent image of said record, and subjecting said layer to a disintegrating agent of the layer metal during a limited time period, to cause a differential disintegration at the activated and non-activated areas, respectively, of the layer metal such as to substantially remove the metal at one of said last-mentioned areas, whereby to convert said latent image into a visible image upon said member.

9. A method of producing copies of printed matter, designs, drawings and the like, comprising providing a base member having deposited thereon a coherent layer consisting of highly-dispersed metallic particles and having a thickness of from about 0.005 to 2μ, contacting said layer with the surface of the printed matter, drawings, designs and the like to be reproduced to cause a transfer of pigment onto the metallized surface outlining selected areas conforming to the print, drawings, and the like to be reproduced, to thereby form a latent image upon said layer, and subjecting said layer to a disintegrating agent during a predetermined time period, to cause a differential disintegration, respectively, of said selected areas and the surrounding areas of said layer such as to substantially remove the metal at one of said last-mentioned areas, whereby to convert said latent image into a visible image upon said member.

References Cited in the file of this patent

UNITED STATES PATENTS

| | | |
|---|---|---|
| 2,600,343 | Tuttle | June 10, 1952 |
| 2,626,206 | Adler et al. | June 20, 1953 |

FOREIGN PATENTS

| | | |
|---|---|---|
| 593,014 | Great Britain | Oct. 6, 1947 |